United States Patent
Kim et al.

(10) Patent No.: US 7,324,480 B2
(45) Date of Patent: Jan. 29, 2008

(54) MOBILE COMMUNICATION APPARATUS AND METHOD INCLUDING BASE STATION AND MOBILE STATION HAVING MULTI-ANTENNA

(75) Inventors: Sung-Jin Kim, Suwon (KR); Ki-Ho Kim, Seoul (KR); Chang-Soon Park, Seoul (KR); Kwang-Bok Lee, c/o Mobile Communications Lab., Institute of New Media and Communications, Seoul National University, San 56-1 Sinlim-dong, Gwanak-gu, Seoul, 151-742 (KR)

(73) Assignees: Samsung Electronics., Ltd., Suwon-si, Gyeonggi-do (KR); Kwang-Bok Lee, Seoul (KR)

( * ) Notice: Subject to any disclaimer, the term of this patent is extended or adjusted under 35 U.S.C. 154(b) by 109 days.

(21) Appl. No.: 10/520,694

(22) PCT Filed: Jul. 10, 2003

(86) PCT No.: PCT/KR03/01367

§ 371 (c)(1),
(2), (4) Date: Jun. 23, 2005

(87) PCT Pub. No.: WO2004/008662

PCT Pub. Date: Jan. 22, 2004

(65) Prior Publication Data
US 2006/0019709 A1    Jan. 26, 2006

(30) Foreign Application Priority Data
Jul. 10, 2002  (KR) .................. 10-2002-0040107

(51) Int. Cl.
*H04M 1/00*    (2006.01)

(52) U.S. Cl. ............ 370/334; 370/449; 370/342; 370/344; 370/437; 370/433; 370/473; 370/514; 370/444; 455/561; 455/562.1

(58) Field of Classification Search .......... 455/101, 455/132, 553.1, 561, 562.1; 370/319, 334, 370/342, 344
See application file for complete search history.

(56) References Cited

U.S. PATENT DOCUMENTS

| 7,020,110 | B2 * | 3/2006 | Walton et al. | ............ 370/334 |
| 2003/0087673 | A1 * | 5/2003 | Walton et al. | ............ 455/562 |
| 2005/0130664 | A1 * | 6/2005 | Sang et al. | ............ 455/450 |

FOREIGN PATENT DOCUMENTS

KR    10-2002-0027247    4/2002

(Continued)

*Primary Examiner*—Joseph Feild
*Assistant Examiner*—Randy Peaches
(74) *Attorney, Agent, or Firm*—Lee & Morse, P.C.

(57) ABSTRACT

A mobile communication apparatus including a base station and at least two mobile stations, having multiple antennas, respectively is provided. In the mobile communication apparatus, the base station restores from feedback signals transmitted from the mobile stations weight information determined in the mobile stations, generates from the restored weight information downlink control information ensuring maximum throughput to each of the mobile stations, and selects from among data of all of the mobile stations data of a desired mobile station(s) to be transmitted, based on the downlink control information. Each of each of the mobile stations has at least one mobile station antenna, the base station has at least two base station antennas, and the downlink control information includes mobile station selection information, an optimal basis matrix index, and optimal gain indices. As a result, nominal peak throughput in multi-antenna mobile communications can be efficiently achieved at low costs.

25 Claims, 8 Drawing Sheets

| | FOREIGN PATENT DOCUMENTS | | KR | 10-2003-0033601 | 5/2003 |
|---|---|---|---|---|---|
| KR | 10-2002-0089094 | 11/2002 | | | |
| KR | 10-2003-0017946 | 3/2003 | * cited by examiner | | |

MOBILE COMMUNICATION APPARATUS AND METHOD INCLUDING BASE STATION AND MOBILE STATION HAVING MULTI-ANTENNA

FIELD OF THE INVENTION

The present invention relates to mobile communications, and more particularly, to a mobile communication apparatus including multi-antenna base station and mobile stations, which maximizes throughput in a multi-user communication environment based on high-speed downlink wireless packet access, and a mobile communication method therefor.

DESCRIPTION OF THE RELATED ART

Various technologies are used to maximize throughput in mobile communications. As such, logical improvements using new wireless access and physical improvements using, for example, multiple antennas, have attracted more attention than other methods.

First, as an example of a new wireless access based logical improvement, next-generation mobile communication system standardization associations have proposed in recent years new standard packet access technologies enabling high-speed packet transmission via downlinks. The $3^{rd}$ Generation Partnership Project (3GPP), an asynchronous standardization association led by Europe and Japan, works for the standardization of high-speed downlink packet access (HSDPA) technology, and the 3GPP2, a synchronous standardization association led by the U.S. works for the standardization of 1× Evolution Data Only/Voice (1×EV-DO/V) technology. The HSDPA and 1×EV-DO/V technologies suitable for-web-based Internet 25 services are based on high-speed downlink packet access for wireless packet transmission. Since high-speed downlink packet access is optimized for peak throughput as well as average throughput, it can achieve peak throughput in an intermittent wireless packet transmission environment. The implementation of such a high-speed downlink packet access technology basically requires an adaptive modulation & coding (AMC) technology, a hybrid automatic request (HARQ) technology, and a multi-user diversity scheduling technology. Basic technologies for high-speed downlink packet access are described in an European IMT-2000 standard, the 3GPP specification available at www.3gpp.org, the 3GPP2 specification available at www.3gpp2.org, and the article "CDMA/HDR: A Bandwidth Efficient High Speed Wireless Data Service for Nomadic Users" by P. Bender, P. Black, M. Grob, R. Padovani, N. Sindhushayana, and A. Viterbi, IEEE Communications, Vol. 38(7), 70-78, July, 2000.

Second, unlike the wireless access improvement method enabling the efficient use of bandwidths within a given range, a physical improvement method using multiple antennas increases bandwidth resources using more spatial resources to maximize throughput. Recently, Lucent Technologies verified through intensive research into BLAST (Bell Labs LAyered Space Time) that the bandwidth is increased min(N,M) times when using N base station antennas and M mobile station antennas compared to when using a single base station antenna and a single mobile station antenna. Here, min(N,M) means the minimum of N and M. This research ensured the effectiveness of using multiple antennas for peak throughput. The principle of increasing the channel capacity using multiples antennas in a base station and mobile stations can be explained based on a matrix rank criterion. The number of paths is determined by the rank characteristic of the matrix H of channel downlink characteristics of multiple base station and mobile station antennas. A rich scatter environment for mobile communications can be created by a number of uncritical obstacles. In such a rich scatter communication environment, the theoretical maximum capacity $C_{MAX}$ of a multi-antenna communication system including a base station and a single mobile station is expressed as equation (1) below based on Shannon's channel capacity bound principle.

$$C_{MAX} = \log_2 \det\left[I + \frac{1}{\sigma_n^2} H^H P H\right] \quad (1)$$

where I denotes an identity matrix, P denotes a diagonal matrix of power allocation parameters, and $\sigma_n^2$ denotes the variance of noise. Shannon's channel capacity bound principle and Lucent's BLAST technology are described in the article entitled "On Limits of Wireless Communications in a Fading Environment When Using Multiple Antennas," by G. J Foschini and M. J. Gans, Wireless Personal Communications, Vol. 6, 311-335, August 1998.

In particular, Lucent's BLAST technology provides maximum channel capacity based on equation (1) in an environment where one base station corresponds to one mobile station; Since the BLAST technology does not require channel information feedback, no problems arise from channel information feedback delay and channel information feedback errors. However, in a multi-antenna system based on Lucent's BLAST technology, in which data is transmitted via only one channel between the base station and the mobile station, and no channel information is fed back, it is impossible to apply a nulling method, which forms a principle of multi-antenna systems, and to achieve peak throughput in a multi-user, multi-antenna system environment. In addition, there is a structural limitation in that more mobile station antennas than base station antennas are required. The concept of the nulling principle for multi-antennal systems is described in the article entitled "Applications of Antenna Arrays to Mobile Communications, Part I: Performance Improvement, Feasibility, and System Considerations," by LAL C. GODARA, Proceedings of the IEEE, Vol. 85, No. 7, 1031-1097, July 1997 (refer to D. Null Beamforming on page 1041).

In the above-described physical improvement method using multiple antennas, channel information cannot be fed back in a low-speed Doppler environment including low-speed mobile stations, in which channel switching rarely occurs, or in a high-power environment ensuring minimal channel feedback errors, so that peak throughput cannot be achieved. The problem of poor throughput is more serious because information fed back from a plurality of mobile stations cannot be considered concurrently.

SUMMARY OF THE INVENTION

The present invention provides a mobile communication apparatus including a base station and at least two mobile stations, in which each of the base and mobile stations has multiple antennas. In the mobile communication apparatus, the downlink characteristics of each of the mobile stations as well as the channel downlink characteristics of spatial, sub-channels in each of the antennas are considered for optimal beamforming and multi-stream data transmission via the base station antennas, thereby achieving nominal throughput in multi-user, multi-antenna systems.

The present invention also provides a mobile communication method performed in the above mobile communication apparatus, which includes a base station having multiple antennas and at least two mobile stations having multiple antennas.

In accordance with one aspect of the present invention, there is provided a mobile communication apparatus including a base station having multiple antennas and at least two mobile stations having multiple antennas, wherein the base station restores from feedback signals transmitted from the mobile stations weight information determined in the mobile stations, generates from the restored weight information downlink control information ensuring maximum throughput to each of the mobile stations, and selects from among data of all of the mobile stations data of desired mobile stations to be transmitted, based on the downlink control information. Each of the mobile stations has at least one mobile station antenna, the base station has at least two base station antennas, and the downlink control information includes mobile station selection information, an optimal basis matrix index, and optimal gain indices.

In the mobile communication apparatus, the base station may perform a predetermined signal process on the data of the desired mobile station, which are selected based on the downlink control information, matrix-multiply the processed data by a basis matrix having the optimal basis matrix index in the downlink control information to generate data signals, add mobile station bit size information and the pilot channel signals to the data signals, and transmit the added results to the desired mobile station on a frame by frame basis.

According to a specific embodiment of the present invention, the base station may comprise: a feedback information restoration unit which restores from the feedback signals received from the mobile stations the weight information of each of the mobile stations and outputs the restored weight information; a downlink control information generation unit which generates the downlink control information based on the restored weight information received from the feedback information restoration unit and outputs the generated downlink control information; and a mobile station data selection unit which selects from among the data of all of the mobile stations the data of the desired mobile station based on the mobile station selection information, extracts an amount of data from the selected data based on a predetermined bit size, and combines the extracted data into frames, each of which has the predetermined bit size, for transmission to the desired mobile station.

In another embodiment, each of the mobile stations may comprise: a channel characteristics measurement unit measures the channel downlink characteristics based on the pilot channel signals received via the at least one mobile station antenna; a channel information determination unit which determines the weight information ensuring maximum throughput to each of the mobile stations based on the channel downlink characteristics; and an information feedback unit which converts the weight information input from the channel information determination unit into the feedback signal and transmits the feedback signal via the at least one mobile station antennas to the base station.

In accordance with another aspect of the present invention, there is provided a method of mobile communications between a base station having multiple antennas and at least two mobile stations having multiple antennas, the method comprising step (a) of: the base station restoring feedback signals transmitted from the mobile stations weight information determined in the mobile stations, generating from the restored weight information downlink control information ensuring maximum throughput to each of the mobile stations, and selecting from among data of all of the mobile stations data of a desired mobile station to be transmitted, based on the downlink control information, wherein each of the mobile stations has at least one mobile station antenna, the base station has at least two base station antennas, and the downlink control information includes mobile station selection information, an optimal basis matrix index, and optimal gain indices.

BRIEF DESCRIPTION OF THE DRAWINGS

The above and other features and advantages of the present invention will become more apparent to those of skill in the art by describing in detail exemplary embodiments thereof with reference to the attached drawings in which.

DETAILED DESCRIPTION OF THE INVENTION

Korean Patent Application No. 10-2002-004107, filed on Jul. 10, 2002, in the Korean Intellectual Property Office, and entitled: "MOBILE COMMUNICATION APPARATUS AND METHOD INCLUDING BASE STATION AND MOBILE STATION HAVING MULTI-ANTENNA," is incorporated by reference herein in its entirety.

The structure and operation of a mobile communication apparatus utilizing multiple base station and mobile station antennas and a mobile communication method therefor according to the present invention will be described in detail with reference to the appended drawings.

Figure 1:
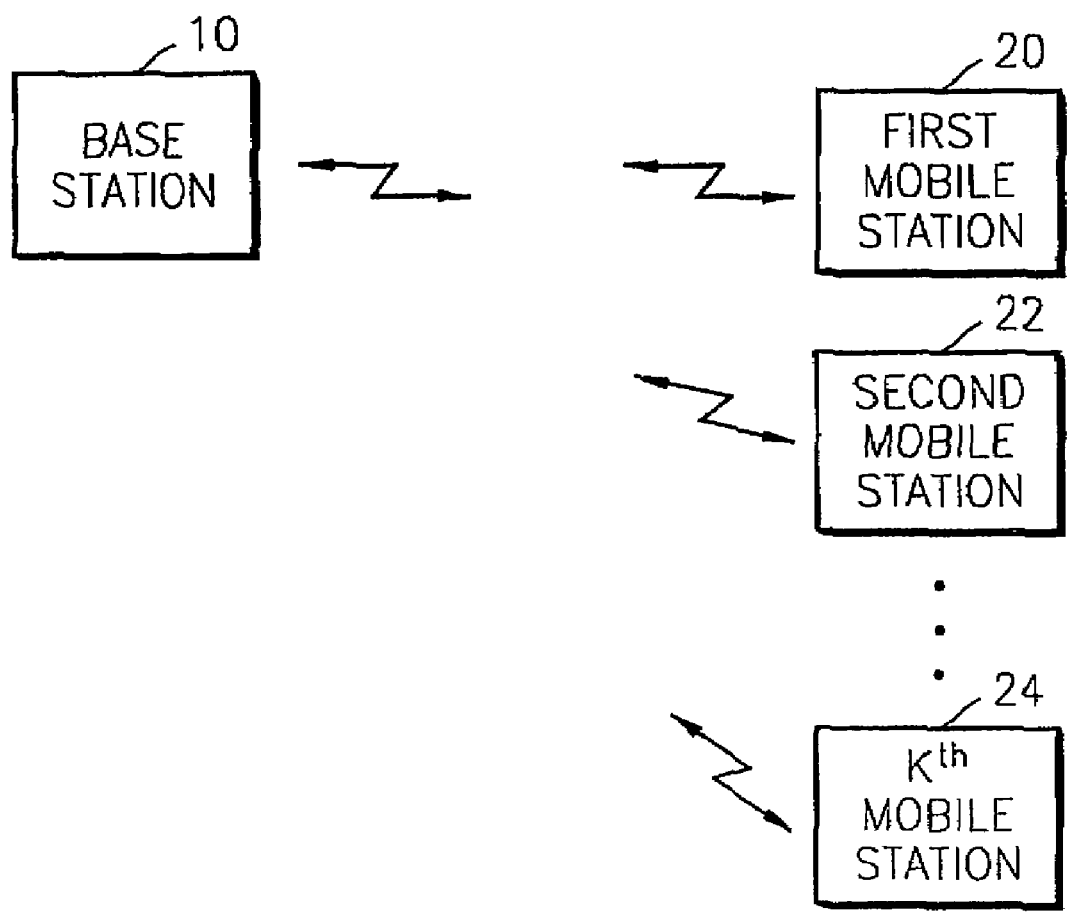
FIG. 1 is a block diagram of a mobile communication apparatus according to an embodiment of the present invention.

As shown in FIG. 1, which is a block diagram of a mobile communication apparatus according to an embodiment of the present invention, the mobile communication apparatus includes a base station 10, a first mobile station 20, a second mobile station 22, . . . , and a $K^{th}$ mobile station 24. The base station 10 has at least two antennas, and each of the mobile stations 20 through 24 has at least one antenna.

Figure 2:
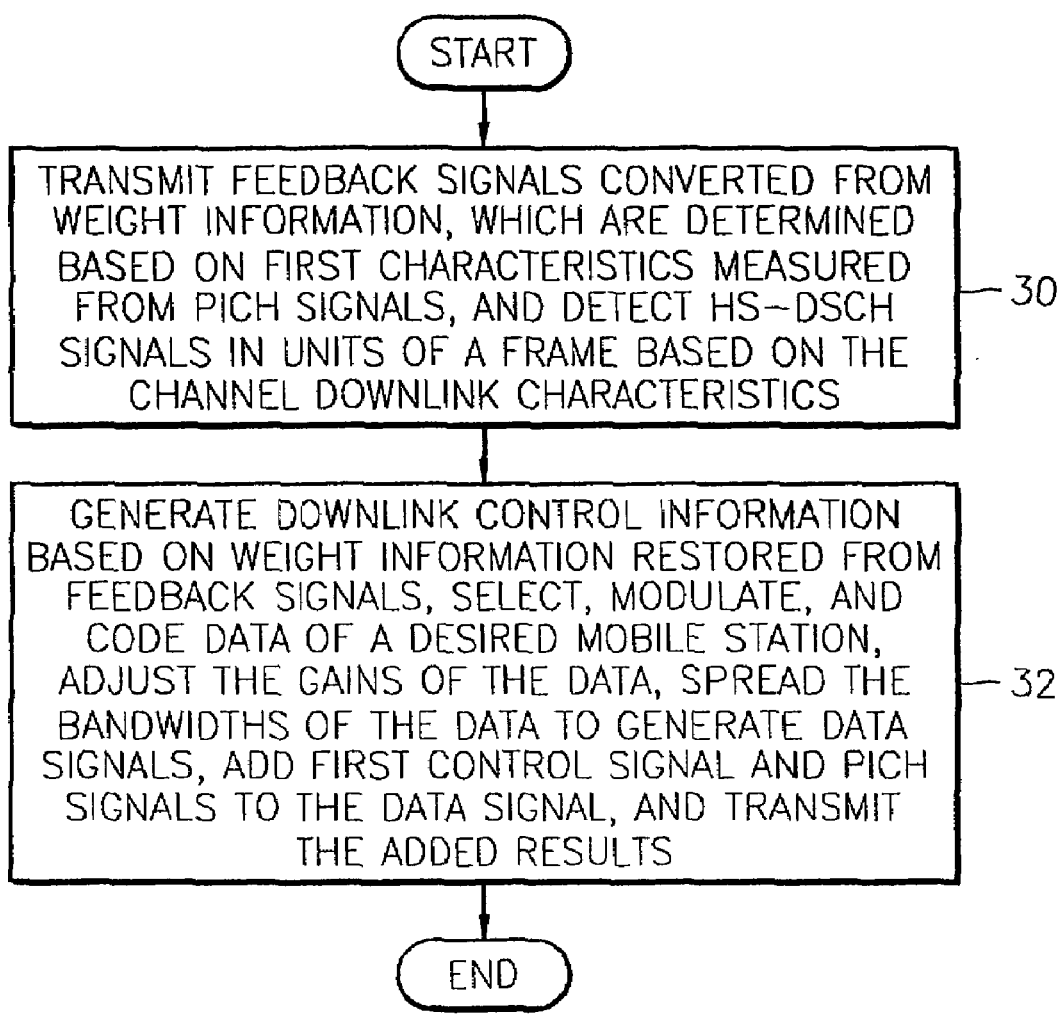
FIG. 2 is a flowchart of a mobile communication method according to an embodiment of the present invention performed in the mobile communication apparatus of FIG. 1.

FIG. 2 is a flowchart illustrating a mobile communication method according to an embodiment of the present invention, which is performed in the mobile communication apparatus of FIG. 1. The mobile communication method includes determining and transmitting weight information and detecting high-speed downlink shared channel (HS-DSCH) signals (step 30) and adding first control signals and pilot channel (PICH) signals to data signals generated based on the weight information restored from feedback signals and transmitting the added results (step 32).

In FIG. 2, the first mobile station 20, the second mobile station 22, . . . , and the $K^{th}$ mobile station 24, where K is an integer of 2 or greater, have the same function. According to the present invention, each of the mobile stations 20, 22, . . . , and 24 includes M(k) mobile station antennas where M(k) is an integer of 1 or greater, and k denotes mobile station number and $1 \leq k \leq K$. The number of mobile stations, M(k), may be smaller than or equal to the number of base station antennas, N, where N is an integer of 2 or greater, which is expressed as $1 \leq M(k) \leq N$. The number of mobile stations, M(k), may be greater than or equal to the number of base station antennas, N, which is expressed as $N \leq M(k)$.

The base station 10 of FIG. 1 restores from feedback signals received from the first through $K^{th}$ mobile stations 20 through 24, which are based on the channel downlink characteristics of the multiple base station and mobile station antennas (hereinafter, referred to as first characteristics H(k), where H(k) is a matrix with $1 \leq k \leq K$, weight information determined in each of first through $K^{th}$ mobile stations 20 through 24. Hereinafter, capital bold letters indicate matrices, small bold letters indicate vectors, and non-bold symbols indicate scalars. The base station 10 also generates from the restored weight information of each of the mobile stations downlink control information ensuring maximum throughput, selects data of a desired mobile station for transmission from among data of all of the mobile stations based on the downlink control information, modulates and codes the selected data, adjusts the gains of the selected data, and spreads the bandwidths of the selected data. The base station 10 multiplies the bandwidth-spread data by a basis matrix selected based on the downlink control information, adds a first control signal, which indicates the bit size of data to be transmitted to each of the mobile stations, and pilot channel signals PICHi, where i is an integer from 1 to N, to the products and transmits the added results to each of the first through $K^{th}$ mobile stations 20 through 22 on a frame by frame basis (step 32).

In the above description, the downlink control information includes mobile station selection information, the indices of an optimal basis matrix (hereinafter, optimal basis matrix indices), and the indices of optimal gain values (hereinafter, optimal gain indices), as described later. The first characteristics H(k) means the phase and magnitude of a signal transmitted via a channel from the base station 10 to an arbitrary mobile station 20, 22, . . . , or 24. The matrix of the first characteristics H(k) consists of channels for base station antennas in columns and channels for mobile station antennas in rows. In other words, the column components of the matrix of the first characteristics H(k) are obtained in the base station antenna space, and the row components thereof are obtained in the mobile station antenna space. The pilot channel signals $PICH_i$ may be common pilot channel (CPICH) signals, dedicated common pilot channel (DCPICH) signals, secondary common pilot channel (SCPICH) signals, etc. Although the data of the desired mobile station selected based on the downlink control information are processed by modulation and coding, gain adjustment, and bandwidth spreading in the above, other various processing methods can be applied to the selected data without limitation.

The first through $K^{th}$ mobile stations 20 through 24 can be implemented in any structure as far as they can ensure the above operations to the base station 10. For example, it is necessary for each of the mobile stations 20 through 24 to determine the weight information based on the first characteristics H(k) for each antenna. In particular, each of the mobile stations 20 through 24 measures the first characteristics H(k) based on the PICH signals transmitted from the base station 10, determines the weight information ensuring peak throughout to each base/mobile station antenna, converts the determined weight information into feedback signals, transmits the feedback signals to the base station 10, and detects a high-speed downlink shared channel (HS-DSCH) signal in units of a frame based on the first characteristics H(k) and based on the first control signal and data signals, which are received from the base station 10 (step 30).

Each of the mobile stations 20 through 24 analyzes the first control signal received through the mobile station antennas to determine whether the first control signal transmitted from the base station 10 is correctly addressed thereto. The HS-DSCH signal reflects the second and third characteristics of the channels. The second characteristics show that the transmission of data through a channel is completed without channel switching because the length of a data frame, i.e., the unit of data transmission, is much shorter than the channel coherence time due to a general Doppler effect. The third characteristics are related to the non-continuous, burst transmission of data through a channel commonly owned by all of the mobile stations 20 through 24 belonging to the base station 10.

For the convenience of understanding the present invention, embodiments of the first, second, . . . , or $K^{th}$ mobile station 20, 22, . . . , or 24 and step 30 in FIG. 2 will be described first, followed by descriptions on embodiments of the base station 10 and step 32 in FIG. 2.

Figure 3:
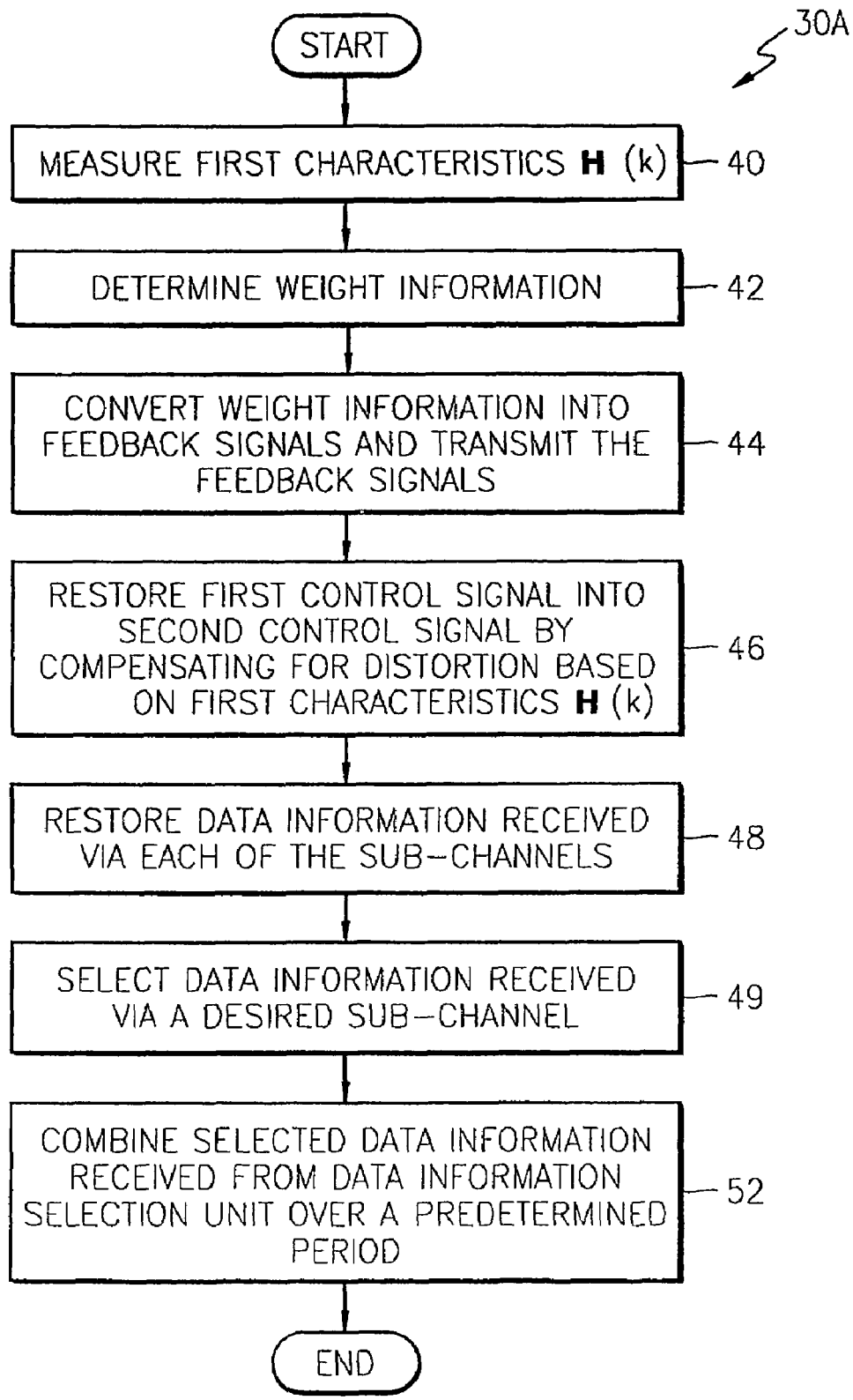
FIG. 3 is a flowchart of an embodiment of step 30 in FIG. 2 according to the present invention.

FIG. 3 is a flowchart illustrating an embodiment 30A of step 30 of FIG. 2 according to the present invention, which includes transmitting the weight information determined based on the first characteristics H(k) to the base station 10 (steps 40 through 44) and selecting and combining desired data information from among data information restored based on data signals transmitted from the base station 10 (steps 46 through 52).

Figure 4:
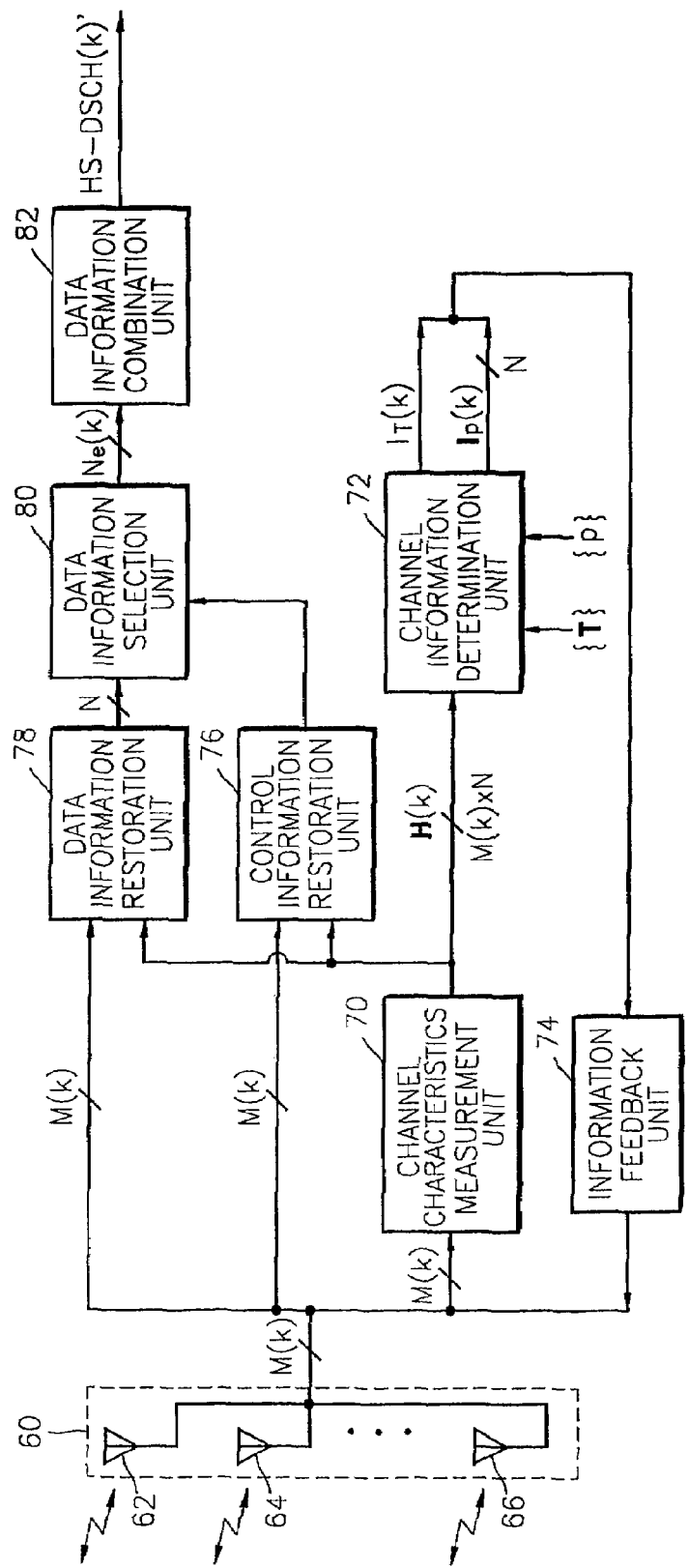
FIG. 4 is a block diagram of an embodiment of a first, second, . . . , or $K^{th}$ mobile station of FIG. 1 according to the present invention.

FIG. 4 is a block diagram of an embodiment of the first, second, . . . , or $K^{th}$ mobile station 20, 22, . . . , 24 of FIG. 1, which includes an antenna array 60, a channel characteristics measurement unit 70, a channel information determination unit 72, an information feedback unit 74, a control information restoration unit 76, a data information restoration unit 78, a data information selection unit 80, and a data information combination unit 82.

In particular, the antenna array 60 of FIG. 4 includes M(k) mobile antennas 62, 64, . . . , and 66. The antenna array 60 receives PICH signals, data signals, and a first control signal transmitted from the base station 10. The channel characteristics measurement unit 70 measures the first characteristics H(k) based on the PICH signals received via the antenna array 60 from the base station 10 and outputs the measured first characteristics H(k) to the channel information determination unit 72, the control information restoration unit 76, and the data information restoration unit 78 (step 40).

After step 40, the channel information determination unit 72 determines the weight information enabling maximum throughput based on the first characteristics H(k) and using a set of basis matrices set {T} and a set of gain values {p} and outputs the determined weight information to the information feedback unit 74 (step 42). The weight information includes basis matrix indices $I_T(i)$ and gain indices $I_P(i)$. When a basis matrix with a particular index is denoted as T($I_T$) and a gain value with a particular index is denoted as P($I_P$) in equation (2) below, the maximum capacity C'$_{MAX}$ of the mobile communication apparatus for multiple users, which includes multiple base station/mobile station antennas, is expressed as equation (3) below based on Shannon's channel capacity bound principle.

$$P(I_P)=\text{diag}[p(I_P(1))p(I_P(2))\ldots p(I_P(N))]^T \quad (2)$$

where diag means a diagonal matrix.

$$C'_{MAX} = \underset{P(I_P),T(I_T)}{MAX} \log_2\det[I + \rho P(I_P)T(I_T)^H H^H HT(I_T)P(I_P)] \quad (3)$$

where ρ denotes a signal to interference and noise ratio. Since the number of mobile station antennas, M(k), is greater than or equal to 1 and less than or equal to N, the basis matrix vector size and the gain size are less than or equal to N. This is conceptually the same as when some of the gain values become null (=0) according to the first characteristics, i.e., downlink channel characteristics, of the multiple base station and mobile station antennas. In the two cases, the indices of zero gains are selected without setting the basis matrix vector size and the gain size to N.

After step 42, the information feedback unit 74 converts the weight information $I_T(i)$ and $I_P(i)$ input from the channel information determination unit 72 into feedback signals for transmission to the base station 10 by general communication signal processing and transmits the converted feedback signals via the antenna array 60 to the base station 10 (step 44). In particular, the information feedback unit 74 formats the weight information $I_T(i)$ and $I_P(i)$ input from the channel information determination unit 72, time-division-multiplexes the formatted results, and transmits the time-division-multiplexed results as the feedback signals via the antenna array 60 to the base station 10. Alternatively, the information feedback unit 74 may process the formatted weight information into the feedback signals by code division multiplexing or frequency division multiplexing, instead of time division multiplexing.

After step 44, the control information restoration unit 76 compensates for distortion in the first control signal received via the antenna array 60 from the base station 10 based on the first characteristics H(i) input from the channel characteristics measurement unit 70, restores a second control signal from the restored first control signal, and outputs the restored second control signal to the data information selection unit 80 (step 46). The second control signal includes information on whether the data signals are received through a desired sub-channel and information on the bit size of the data signals. The second control signal may be restored from the first control signal through general multi-antenna signal, processes as in step 48 described later.

After step 46, the data information restoration unit 78 restores the data information received via all the sub-channels based on the data signals received from the base station 10 via the antenna array 60 and the first characteristics H(i) provided from the channel characteristics measurement unit 70 and outputs the restored data information of all the sub-channels to the data information selection unit 80 (step 48). The data signals received from the base station 70 are expressed as r(k) in equation (4) below and can be modelled using equation (5) below.

$$r(k)=[r(1,k)r(2,k)\ldots r(N,K)]^T \quad (4)$$

where r(n,k) denotes a data signal received via the n$^{th}$ antenna of the K$^{th}$ mobile station.

$$r(k)=H(k)s+n(k)=U(k)\Sigma(k)V^H(k)s+n(k) \quad (5)$$

where n(k) denotes a noise component, and U(k)Σ(k) V$^H$(k) means singular value decomposition (SVD), which is a kind of common matrix operation, using the first characteristics H(k), and s is modeled as equation (6) below. SVD in multi-antenna systems is described in an article entitled "Fading Correlation and Its effect on the Capacity of Multielement Antenna Systems" by Da-Shan Shiu, Gerard J. Foschini, Michael J. Gans, and Joseph M Kahn, IEEE Transactions on Comm. Vol. 48, No. 3, 502-513, March 2003.

$$s=TPd \quad (6)$$

where T and P denotes the optimal basis matrix and the optimal gain value determined in the base station, respectively, and particularly, P is a diagonal matrix of optimal gain values expressed as diag[p].

A data signal $r_{(n)}$ where n is an integer from 1 to min(N, K), which transmitted from the base station 10 as multiple streams after beamforming for each of the mobile stations and received in the mobile station 20, 22, . . . , or 24, is expressed as equation (7) below using multiple-weight information. The above-described equation (5) is established based on the following assumption.

$$r_{(1)} = [W_{(1)}^H d_{(1)} + W_{(2)}^H d_{(2)} + \ldots + W_{(N)}^H d_{(n)}]H_{(1)} + n_{(1)} \quad (7)$$
$$r_{(2)} = [W_{(1)}^H d_{(1)} + W_{(2)}^H d_{(2)} + \ldots + W_{(N)}^H d_{(n)}]H_{(2)} + n_{(2)}$$
$$\vdots$$
$$r_{(N)} = [W_{(1)}^H d_{(1)} + W_{(2)}^H d_{(2)} + \ldots + W_{(N)}^H d_{(n)}]H_{(N)} + n_{(N)}$$

where $r_{(1)}, r_{(2)}, \ldots,$ and $r_{(n)}$ denote the data signals received in the first, second, . . . , and K$^{th}$ mobile stations, respectively; $d_{(1)}, d_{(2)}, \ldots,$ and $d_{(N)}$ denote data information transmitted from the base station 10 via the sub-channels to N mobile stations, and particularly, $d_{(1)}$=[$d_1$ 0 . . . 0], $d_{(2)}$=[0 $d_1$ . . . 0], . . . , and $d_{(N)}$=[0 0 . . . $d_1$]; $W_{(1)}, W_{(2)}, \ldots,$ and $W_{(N)}$ denote beamforming matrices for making the data information transmitted from the base station 10 to N mobile stations null; $W_{(k)}$ denotes the above-described basis matrix (T); and $H_{(1)}, H_{(2)}, \ldots,$ and $H_{(N)}$ denote the first characteristics measured in N mobile stations. Alternatively, each data information $d_{(1)}, d_{(2)}, \ldots,$ and $d_{(N)}$ transmitted to N mobile stations may include at least two $d_1$. For example, $d_{(1)}$ may be [$d_1$ $d_1$ . . . $d_1$] or [$d_1$ $d_1$ . . . 0]. According to the present invention, with the assumption that $W_{(1)}$= $W_{(2)}$= . . . =$W_{(N)}$=T and $H_{(1)}$=$H_{(2)}$= . . . =$H_{(N)}$=H(k) within allowable error ranges, the data information d received via the sub-channels may be restored using the first characteristics H(k) and the data signals r=[$r_{(1)}$ $r_{(2)}$ . . . $r_{(N)}$], as in equation (8) below.

$$\tilde{d}(k) = U^H(k)r(k) = U^H(k)(H(k)s + n(k)) \quad (8)$$
$$= U^H(k)\left(U(k)\sum(k)V^H(k)s + n(k)\right)$$
$$= \sum(k)V^H(k)TPd + U^H(k)n(k)$$
$$= \sum(k)Pd + \hat{n}(k)$$

where U(k) and V(k) denote right and left unitary matrices, respectively, Σ(k) denotes a diagonal matrix of singular values. To solve equation (3) above, the following conditions are required: T=V(k), and theoretical gain values $P_{Node-B}$ should be optimized for peak throughput in a multi-user channel environment. According to the present invention, in the base station 10, the gain values P of a desired mobile station 20, 22, . . . , or 24 are optimally combined into the optimal gain values $P_{Node-B}$. For example, a matrix of singular values $\Sigma_{UE}$ is received from the desired mobile station 20, 22, . . . , or 24 and combined together to form a matrix of singular values $\Sigma_{Node-B}$ for the base station 10, which is expressed as equation (9) below, and $P_{Node-B}$ is obtained from the matrix of the singular values $\Sigma_{Node-B}$ using a water-filling method. The water-filling method is described in a book entitled "Digital Baseband Transmission and Recording" by Jan W. M. Bergmans, Kluwer Academic Press, Boston, 1996. The above unitary matrix V may be a theoretical basis matrix.

$$\sum_{Node-B} = diag\left[\sum_{UE}(k(1), n(1)), \sum_{UE}(k(2), n(2)), \ldots, \sum_{UE}(k(N), n(N))\right]$$  (9)

After step 48, the data information selection unit 80 selects data information received a desired sub-channel from among the data information received from the data information restoration unit 78, which is transmitted via all of the sub-channels, according to the second control signal input from the control information restoration unit 76, and outputs $N_e(k)$ selected data information where $0 \leq N_e(k) \leq N$, which are received via the desired sub-channel, to the data information combination unit 82 (step 50).

After step 50, the data information combination unit 82 combines the selected data information received from the data information selection unit 80 over a predetermined period $T_{BLOCK}$ corresponding to the length of a frame and outputs the combined result as a high-speed downlink shared channel signal HS-DSCH(i)' of the corresponding mobile station (step 52).

Unlike the embodiment 30A illustrated in FIG. 3, steps 46 and 52 may be performed while steps 42 and 44 are performed. Alternatively, steps 46 through 52 may be followed by steps 42 and 44.

Embodiments of the base station 10 of FIG. 1 and step 32 of FIG. 2 according to the present invention will now be described with reference to FIGS. 5 and 6.

Figure 5:
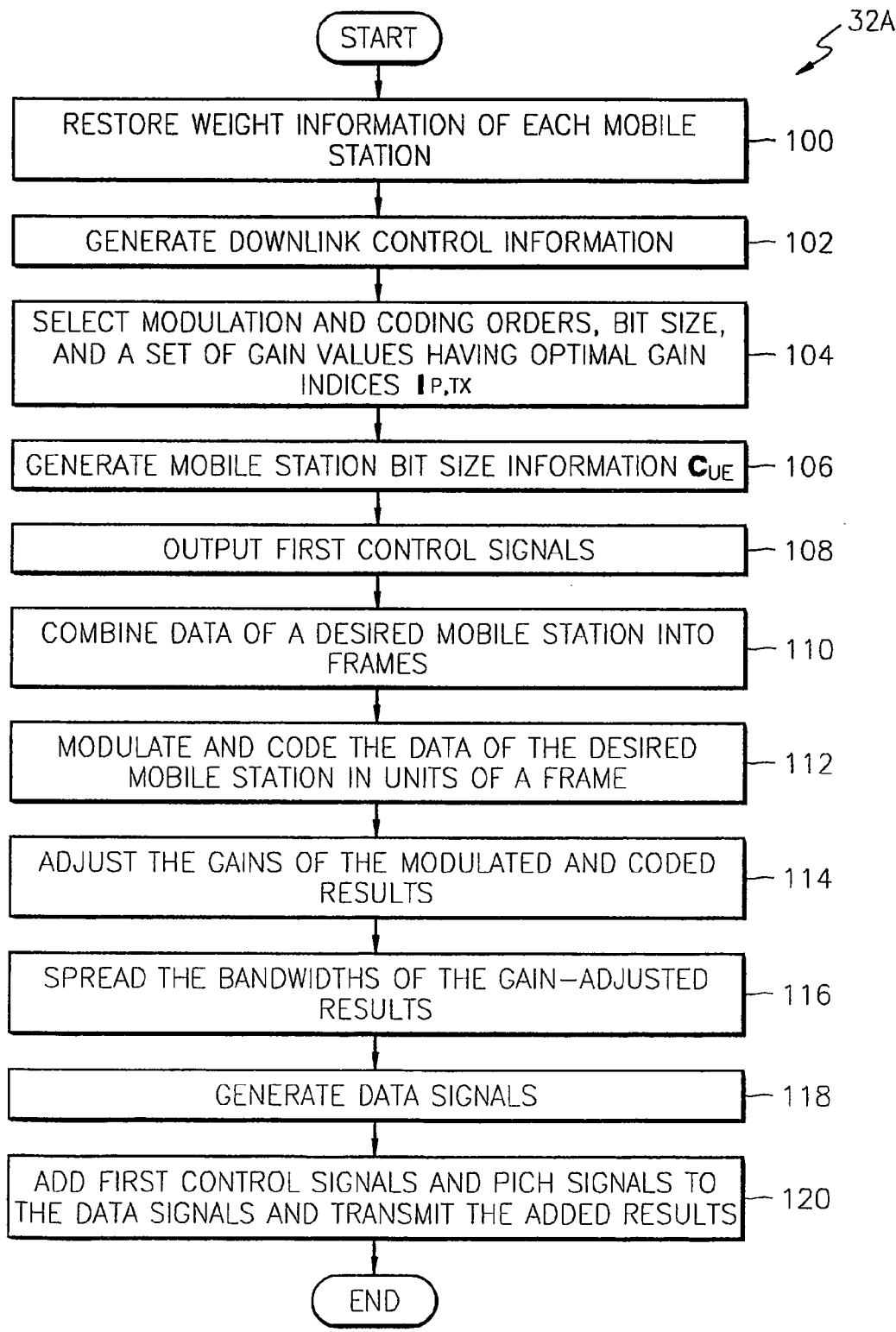
FIG. 5 is a flowchart of an embodiment of step 32 of FIG. 2 according to the present invention.

FIG. 5 is a flowchart illustrating an embodiment 32A of step 32 of FIG. 2 according to the present invention, which includes generating the downlink control information based on the restored weight information (steps 100 and 102), selecting data of a desired mobile station (steps 104 through 110), processing the selected data to generate data signals (steps 112 through 118), and adding the first control signal and pilot channel signals to the data signals and transmitting the added results to the corresponding mobile station (step 120).

Figure 6:
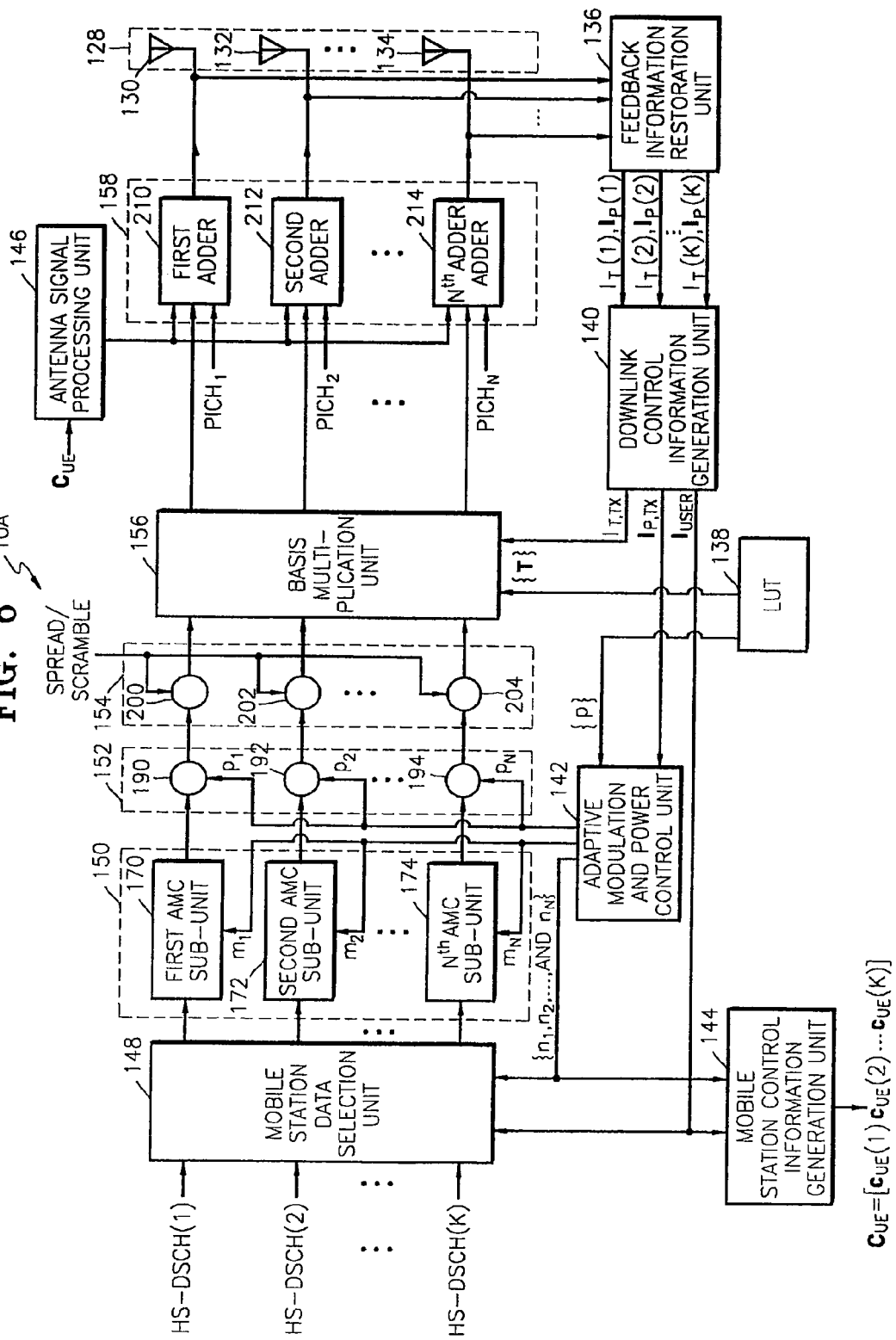
FIG. 6 is a block diagram of an embodiment of a mobile station of FIG. 1.

FIG. 6 is a block diagram of an embodiment 10A of the base station 10 of FIG. 1 according to the present invention, which includes an antenna array 128, a feedback information restoration unit 136, a lookup table (LUT) 138, a downlink control information generation unit 140, an adaptive modulation and power control unit 142, a mobile station control information generation unit 144, an antenna signal processing unit 146, a mobile station data selection unit 148, an adaptive modulation and coding (AMC) unit 150, first and second multiplication units 152 and 154, a basis multiplication unit 156, and an addition unit 158.

The antenna array 128 of FIG. 6 includes N base station antennas 130, 132, . . . , 134. The antenna array 128 receives the feedback signals transmitted from the first through $K^{th}$ mobile stations 20 through 24 as uplink dedicated physical control channel signals (HS-DPCCH) and transmits the result of adding the first control signal and pilot channel signals to the data signals, which are spatially processed HS-DSCH signals, to the first through $K^{th}$ mobile stations 20 through 24.

In particular, after step 30 in FIG. 2, the feedback information restoration unit 136 restores the weight information from the feedback signal received from each of the first through $K^{th}$ mobile stations 20 through 24 and outputs the restored weight information to the downlink control information generation unit 140 (step 100). The restored weight information includes restored basis matrix indices, such as $I_T(1), I_T(2), \ldots,$ and $I_T(K)$, and restored gain indices, such as $I_P(1), I_P(2), \ldots,$ and $I_P(K)$. The restored basis matrix indices, which are generalized as $I_T(k)$, indicate the indices of individual basis matrices $T_1, T_2, \ldots,$ and $T_J$ of a basis matrix set $\{T\}$, where J denotes the number of basis matrices in the set $\{T\}$. The gain indices, which are generalized collectively as $I_P(K)$, consist of $[I_P(1,k)\ I_P(2,k) \ldots I_P(N,k)]^T$. $I_P(n,k)$, where n denotes the number of the basis antenna and $1 \leq n \leq N$, indicates the indices of the individual gain values $p(1), p(2), \ldots,$ and $p(J_p)$ of a gain value set $\{p\}$ where $J_p$ denotes the gain size of the set $\{p\}$.

When the information feedback unit 74 of FIG. 4 generates the feedback signals by time division multiplexing, the feedback information restoration unit 136 restores the weight information by time division demultiplexing. Alternatively, when the information feedback unit 74 generates the feedback signals by code division multiplexing or frequency division multiplexing, the feedback information restoration unit 136 may restore the weight information by code division demultiplexing or frequency division demultiplexing.

After step 100 of FIG. 5, the downlink control information generation unit 140 generates the downlink control information based on the restored weight information input from the feedback information restoration unit 136 and outputs the generated downlink control information (step 102). Among the downlink control information output from the downlink control information generation unit 140, mobile station selection information $I_{USER}$ is output to the mobile station data selection unit 148 and the mobile'station control information generation unit 144, an optimal basis matrix index $I_{T,TX}$ is output to the basis multiplication unit 156, and optimal gain indices $I_{P,TX}$ are output to the adaptive modulation and power control unit 142. The mobile station selection information $I_{USER}$ includes $I_{USER}(1), I_{USER}(2), \ldots,$ and $I_{USER}(3)$. The optimal gain indices $I_{P,TX}$ include $I_{P,TX}(1), I_{P,TX}(2), \ldots,$ and $I_{P,TX}(N)$. The optimal basis matrix index $I_{T,TX}$ includes $I_{T,TX}(1), I_{T,TX}(2), \ldots,$ and $I_{T,TX}(N)$.

Embodiments of step 102 of FIG. 5 and the downlink control information generation unit 140 of FIG. 6 according to the present invention will now be described in detail with reference to FIGS. 7 and 8.

Figure 7:
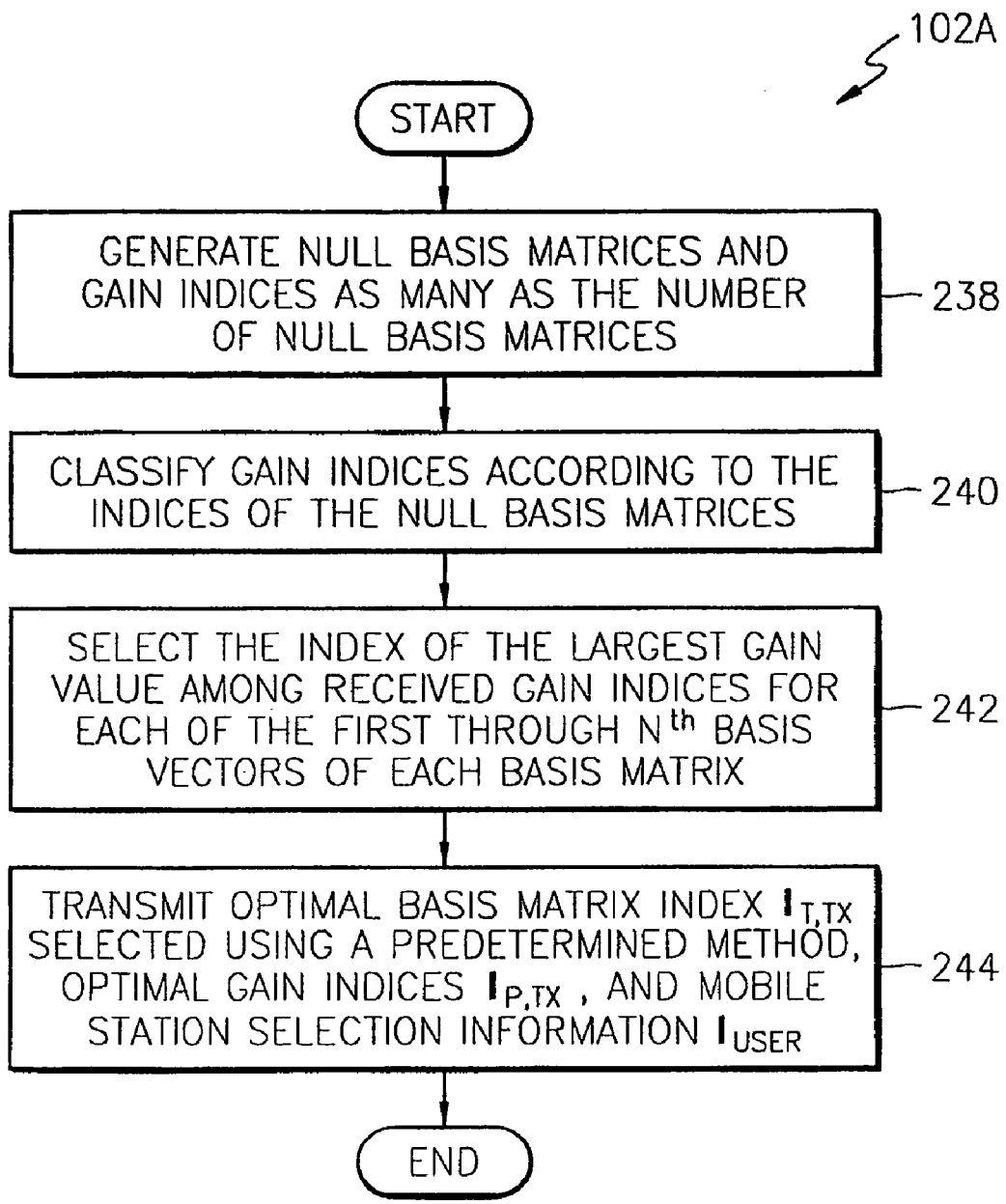
FIG. 7 is a flowchart of an embodiment of step 102 of FIG. 5 according to the present invention.

FIG. 7 is a flowchart illustrating an embodiment 102A of step 102 of FIG. 5 according to the present invention, which includes generating the downlink control information based on the restored weight information (steps 238 through 244).

Figure 8:
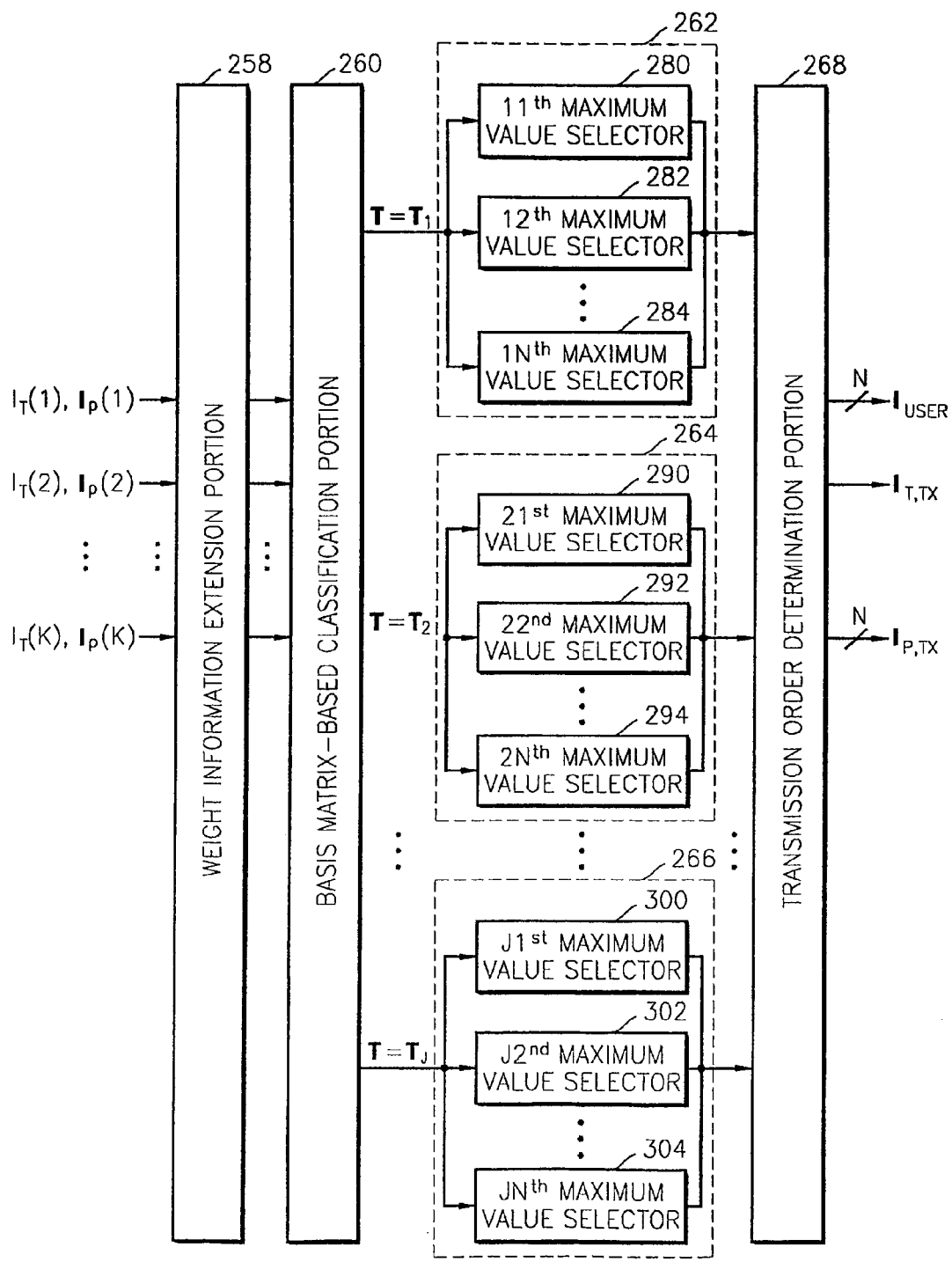
FIG. 8 is a block diagram of an embodiment of a downlink control information generation unit of FIG. 6 according to the present invention.

FIG. 8 is a block diagram of an embodiment 140A of the downlink control information generation unit 140 of FIG. 6 according to the present invention, which includes a weight information extension portion 258, a basis matrix-based classification portion 260, first through $J^{th}$ maximum value selection portions 262 through 266, and a transmission order determination portion 268.

After step 100 of FIG. 5, the gain indices in the restored weight information are analyzed to find gain values including a null, null basis matrices are generated using the found gain values and the basis matrix index in the restored weight information, and gain indices are duplicated and generated as many as the number of generated null basis matrices (step 238). In a null basis matrix, basis vectors other than the basis vector corresponding to a gain value including null have the same value to other basis vectors of other null basis matrices. For example, when a null basis matrix consists of first through $N^{th}$ basis vectors and the first basis vector has null gain, the second through $N^{th}$ basis vectors have common values to other null basis matrices.

In step 238, the weight information extension portion 258 analyzes the gain indices $I_P(1)$, $I_P(2)$, . . . , and $I_P(K)$ in the restored weight information input from the feedback information restoration unit 136 to find the gain values including a null, generates the indices of the null basis matrices based on the found gain values including a null and the basis matrix indices $I_T(1)$, $I_T(2)$, . . . , and $I_T(K)$ in the restored weight information, and duplicates and generates the number of gain indices as many as the number of generated null basis matrices, and outputs the indices of the generated null basis matrices and the generated number of gain indices to the basis matrix-based classification portion 260.

After step 238, the generated gain indices for indices of the null basis matrices are distributed or concentrated (step 240). To this end, the basis matrix-based classification portion 260 allows the generated gain indices for indices of the null basis matrices input from the weight information extension portion 285 to be distributed or concentrated, and outputs the distributed gain indices having the number of a mobile station to one or more first through $J^{th}$ maximum value selection portions 262 through 266 so that the gain indices are classified according to the indices of the generated null basis matrices. Alternatively, the concentrated gain indices may be output to only one of the first through $J^{th}$ maximum value selection portions 262 through 266 without the distribution according to the indices of the generated null basis matrices.

A determination as to whether to distribute or concentrate the gain indices to one or more first through $J^{th}$ maximum value selection portions 262 through 266 is made based the indices of the generated null basis matrices. For example, when the generated null basis matrix T is a first basis matrix $T_1$ with $I_T(k)=1$, the gain indices $I_P(k)$ are output to the first maximum value selection portion 262. In particular, a first gain index $I_P(1,k)$ among the gain indices $I_P(k)$ is output to a $11^{th}$ maximum value selector 280, a second gain index $I_P(2,k)$ is output to a $12^{th}$ maximum value selector 282, and an $N^{th}$ gain index $I_P(N,k)$ is output to a $1N^{th}$ maximum value selector 284. When the generated null basis matrix T is a second basis matrix $T_2$ with $I_T(k)=2$, the gain indices $I_P(k)$ are output to the second maximum value selection portion 264. In particular, the first gain index $I_P(1,k)$ among the gain indices $I_P(k)$ is output to a $21^{st}$ maximum value selector 290, the second gain index $I_p(2,k)$ is output to a $22^{nd}$ maximum value selector 292, and the $N^{th}$ gain index $I_P(N,k)$ is output to a $2N^{th}$ maximum value selector 294. When the generated null basis matrix T is a $J^{th}$ basis matrix $T_J$ with $I_T(k)=J$, the gain indices $I_P(k)$ are output to the $J^{th}$ maximum value selection portion 266. In particular, the first gain index $I_P(1,k)$ among the gain indices $I_P(k)$ is output to a $J1^{st}$ maximum value selector 300, the second gain index $I_P(2,k)$ is output to a $J2^{nd}$ maximum value selector 302, and the $N^{th}$ gain index $I_P(N,k)$ is output to a $JN^{th}$ maximum value selector 304.

After step 240 in FIG. 7, for each of J basis matrices, the index of the largest gain value ("maximum gain index") is selected for each of first through $N^{th}$ basis vectors of the corresponding basis matrix from among the distributed or concentrated gain indices which correspond to a mobile station k(step 242). To this end, each of the first through $J^{th}$ maximum value selection portions 262 through 266, i.e., a $j^{th}$ maximum value selection portion where 1 j J, selects the maximum gain index from among the gain indices, which are received via the basis-matrix classification portion 260, for each of the first through $N^{th}$ basis vectors, and outputs the selected maximum gain index, the value of j indicating the current maximum value selection portion, the number of the basis vector having the largest gain value, and the number of the mobile station corresponding to the maximum gain index, to the transmission order determination portion 268. For example, the first maximum value selection portion 262, where j=1, selects the maximum gain index from among the gain indices, which are received via the basis matrix-based classification portion 260, for each of the first through $N_{th}$ basis vectors, and outputs the selected maximum gain index, the value of j (=1), the number of the basis vector having the selected maximum gain index, and the number of the mobile station corresponding to the selected maximum gain index to the transmission order determination portion 268.

For step 240, the $j^{th}$ maximum value selection portion includes $j1^{st}$ through $jN^{th}$ maximum value selectors. For example, the first maximum value selection portion 262 includes the $11^{th}$ through $1N^{th}$ maximum value selectors 208 through 284, the second maximum value selection portion 264 includes the $21^{st}$ through $2N^{th}$ maximum value selectors 20 through 294, and the $J^{th}$ maximum value selection portion 266 includes the $J1^{st}$ through $JN^{th}$ maximum value selectors 300 through 304. Each of the $J1^{st}$ through $JN^{th}$ maximum value selectors 300 through 304, i.e., a $j^{th}$ maximum value selection portion, selects the maximum gain index from among $K_e$ gain indices where $0 \leq K_e \leq K$, which are received via the basis matrix-based classification portion 260, for each of the basis vectors, and outputs the selected maximum gain index, the value of j, and the number (n) of the basis vector having the largest gain value, and the number (k) of the mobile station corresponding to the selected maximum gain index to the transmission order determination portion 268. Accordingly, the transmission order determination portion 268 can recognize from which one of the first through $j^{th}$ maximum value selection portions 262 through 266 the maximum gain index is received from the input value of j, can recognize which maximum value selector in the corresponding maximum value selection portion has the maximum gain index from the input value of n, and can recognize which mobile station corresponds to the maximum gain index from the input value of k. The maximum gain index output from the $jn^{th}$ maximum value selector of the $j^{th}$ maximum value selection portion, which corresponds to the $k^{th}$ mobile station, can be expressed as equation (10) below.

$$I_{P,TX}(n)|[I_T(k)=j]=min\{I_{P,TX}(n,k)|[I_T(k)=j]\} \qquad (10)$$

where the right term of operator | shows the conditions for the left term.

According to the present invention, when gain values are indexed starting with the largest one in ascending index order, the maximum value selectors in FIG. 8 select the smallest index having the largest gain value.

After step 242, the transmission order determination portion 268 selects an optimal basis matrix index $I_{T,TX}$ from among J basis matrix indices $I_T(k)$ using a predetermined determination method, selects the optimal gain indices $I_{P,TX}$ corresponding to the optimal basis matrix index $I_{T,TX}$ from among the maximum gain indices received from the first through $J^{th}$ maximum value selection portions 262 through 266, selects as mobile station selection information $I_{USER}$ the number of the mobile station corresponding to the optimal basis matrix index $I_{T,TX}$ from among the numbers of the mobile stations received from the first through $J^{th}$ maximum value selection portions 262 through 266, and outputs the selected optimal gain indices $I_{P,TX}$, the selected optimal basis matrix index $I_{T,TX}$, and the selected mobile station selection information $I_{USER}$ (step 244). The transmission order determination portion 268 outputs the optimal gain indices $I_{P,TX}$ in a predetermined order with reference to the values of n's received from the first through $J^{th}$ maximum value selection portions 262 through 266 with reference to the number (n) received from the first through $J^{th}$ maximum value selection portions 262 through 266.

The above predetermined determination method may include a round robin method of selecting one of the basis matrix indices in sequential order as the optimal basis matrix $I_{T,TX}$ and a Max C/I method of selecting as the optimal basis matrix $I_{T,TX}$ one of the basis matrix indices in an order in which the sum of corresponding gain values increases. The round robin and Max C/I methods are described in an article entitled "CDMA/HDR: a bandwidth efficient high speed wireless data service for nomadic users", IEEE Communications Magazine, Vol. 38(7), 70-78, July 2000, and an article entitled "CDMA 2000: High rate packet data air interface specification", TIA/EIA IS-866, November 2000, by P. Bender, P. Black, M. Grob, R. Padovani, N. Sindhushayana, and A. Viterbi. When the weight information fed back in consideration of feedback error ratio and delay rate is determined to be significantly reliable, the Max C/I method, in which one of the basis matrix indices is selected as the optimal basis matrix index $I_{T,TX}$ in an order in which the sum of corresponding gain values increases, is applied.

After step 102 of FIG. 5, modulation and coding orders are selected based on the optimal gain indices $I_{P,TX}$ a required bit size is selected based on the modulation and coding orders, and a set of gain values having the optimal gain indices $I_{P,TX}$ is selected (step 104). Step 104 is implemented using the LUT 138 and the adaptive modulation and power control unit 142. The LUT 138 stores one or more sets of gain values {p} and one or more sets of basis matrices {T}. The adaptive modulation and power control unit 412 calculates modulation and coding orders $m_1, m_2, \ldots$, and $m_N$ based on the optimal gain indices $I_{P,TX}$ input from the downlink control information generation unit 140, calculates the required bit size $\{n_1, n_2, \ldots,$ and $n_N\}$ of a data frame based on the modulation and coding orders $m_1, m_2, \ldots$, and $m_N$, and reads a set of the gain values having the optimal gain indices $I_{P,TX}$ from the LUT 138, and outputs the gain values $p_1, p_2, \ldots$, and $p_N$ to the first multiplication unit 152. A modulation and coding order $m_n$ is proportional to the gain value having the corresponding optimal gain index $I_{P,TX}$.

For example, when the number of data frame symbols is 100, 16-quadrature amplitude modulation (QAM) (4 bits/symbol) is used, and the code rate is ½, the bit size of each data frame is 200 (=100*4*(½)). Here, since the number of data frame symbols, which is equal to 100, is previously set in the mobile station and the base station, the required bit size $n_n$ can be calculated using the modulation and coding order $m_n$, which corresponds to "4" and "½" in the above example.

Alternatively, the adaptive modulation and power control unit 142 may further include a LUT (not shown) storing the modulation and coding orders $m_1, m_2, \ldots$, and $m_N$ and the required bit size $\{n_1, n_2, \ldots,$ and $n_N\}$. In this case, the LUT in the adaptive modulation and power control unit 142 is accessed based on the optimal gain indices $I_{P,TX}$ and the number of frame symbols to read a modulation and coding order $m_n$ and a bit size $n_n$ from the corresponding address of the LUT.

After step 104 of FIG. 5, the mobile station control information generation unit 144 outputs to the antenna signal processing unit 146 the bit size $\{n_1, n_2, \ldots,$ and $n_N\}$, which are input from the adaptive modulation and power control unit 142, and the mobile station selection information $I_{USER}$, which is input from the downlink control information generation unit 140, as mobile station bit size information $C_{UE}$ (step 106). In other words, the mobile station bit size information $C_{UE}$ includes information on the selected mobile station and the bit size $\{n_1, n_2, \ldots,$ and $n_N\}$ required for each of the mobile stations. The mobile station bit size information $C_{UE}$ is expressed as equation (11) below.

$$C_{UE} = [c_{UE}(1) c_{UE}(2) \ldots c_{UE}(K)] \quad (11)$$

where $c_{UE}(k)$ can be expressed as equation (12) below:

$$c_{UE}(k) = [c(1,k) c(2,k) \ldots c(n,k)] \quad (12)$$

where $c(n,k)$ can be expressed as equation (13) below:

$$c(n, k) = \begin{cases} n_n(k), & \text{if } I_T(k) = I_{T,TX}, \forall n, k \\ 0 & \text{otherwise,} \end{cases} \quad (13)$$

As presented in equation (13), for any n and k satisfying $I_T(k) = I_{T,TX}$, $n_n(k)$ is substituted for $c(n,k)$, otherwise 0 is substituted for $c(n,k)$.

After step 106 of FIG. 5, the antenna signal processing unit 146 converts the mobile station bit size information $C_{UE}$ input from the mobile station control information generation unit 144 into wireless signals and outputs the wireless signals to the addition unit 158 as first control signals (step 108).

After step 108, the mobile station data selection unit 148 selects data of desired mobile stations from among data of all of the mobile stations HS-DSCH(1), HS-DSCH(2), . . . , and HS-DSCH(K) based on the mobile station selection information $I_{USER}$, extracts from the selected data of the desired mobile stations an amount of data based on the bit size $\{n_1, n_2, \ldots,$ and $n_N\}$ input from the adaptive modulation and power control unit 142, combines the extracted data of the desired mobile stations into data frames, respectively, each of which has the bit size $\{n_1, n_2, \ldots,$ and $n_N\}$, and outputs the data of the frames to the AMC unit 150 (step 110).

After step 110, the AMC unit 150 modulates and codes the data input from the mobile station data selection unit 148 in units of a frame based on the modulation and coding orders $m_1, m_2, \ldots$, and $m_N$ input from the adaptive modulation and power control unit 142, and outputs the modulated and coded results to the first multiplication unit 150 (step 112). To this end, the AMC unit 150 may be implemented with first, second, . . . , and $N^{th}$ adaptive AMC sub-units 170, 172, . . . , and 174. Each of the first through $N^{th}$ AMC sub-units 170, 172, . . . , and 174, i.e., an $n^{th}$ AMC sub-unit, modulates and codes a data frame output from the mobile station data selection unit 148 based on the corresponding modulating and coding order $m_n$ input from the adaptive modulation and power control unit 142 and outputs the modulated and coded result. The AMC is described in an article entitled "Channel coding for 4G systems with adaptive modulation and coding" by K. L. Baum, P. J. Sartor, and V. Desi, Proceedings of 3G wireless '2001, 496-501, May 30-Jun. 2, 2001, San Francisco, U.S.A.

After step 112, the gains of the modulated and coded results are adjusted (step 114). To this end, the first multiplication unit 152 multiplies the modulated and coded results input from the adaptive modulating and coding unit 150 by the gain values $p_1, p_2, \ldots,$ and $p_N$ input from the adaptive modulation and power control unit 142 and outputs the products to the second multiplication unit 154. The first multiplication unit 152 may be implemented with first, second, and $N^{th}$ multipliers 190, 192, . . . , and 194. Each of the first through $N^{th}$ multipliers 190 through 194, i.e., an $n^{th}$ multiplier, multiplies the modulated and coded result input from the $n^{th}$ AMC coding sub-unit 190, 192, . . . , or 194 by the gain value $p_n$ and outputs the product.

After step 114, the bandwidths of the gain-adjusted results are spread (step 116). To this end, the second multiplication unit 154 multiplies the products input from the first multiplication unit 152 by spread/scramble signal streams and outputs the products to the basis multiplication unit 156. Here, the spread/scramble signal streams refer to the products $C_{sp}C_{sc}$ of multiplying scramble signal streams $C_{sc}$ and spread signal streams $C_{sp}$. The scramble/spread signal streams may be previously stored in the base station 10A or may be externally input as illustrated in FIG. 6.

After step 116, the bandwidth-spread results are matrix-multiplied by a basis matrix having the optimal basis matrix index $I_{T,TX}$ and outputs the products as data signals for transmission to the mobile stations 20, 22, . . . , and 24 (step 118). To this end, the basis multiplication unit 156 reads from the LUT 138 a set of basis matrices {T} corresponding to the optimal basis matrix index $I_{T,TX}$ input from the downlink control information generation unit 140, selects from the set of the basis matrices a basis matrix having the optimal basis matrix index $I_{T,TX}$, matrix-multiplies the products input from the second multiplication unit 154 by the selected basis matrix, and outputs the products of the matrix multiplication as the data signals to the addition unit 158. Here, the matrix multiplication refers to multiplying N basis vectors that belong to the selected basis matrix by N products input from the second multiplication unit 154, respectively and adding the multiplied results.

After step 118, the first control signals and the pilot channel signals are added to the data signals, and the added results are transmitted to the mobile stations 20, 22, . . . , and 24 on a frame by frame basis (step 120). Step 120 is performed using the addition unit 158 and the base station antenna array 128. The addition unit 158 adds the first control signals and the externally input pilot channel signals $PICH_1, PICH_2, \ldots,$ and $PICH_N$ to the data signals input from the basis multiplication unit 156 and outputs the added results to the base station antenna array 128. To this end, the addition unit 158 may be implemented with first, second, . . . , and $N^{th}$ adders 210, 212, . . . , and 214. Each of the first through $N^{th}$ adders 210 through 214, i.e., an $n^{th}$ adder, adds the first control signals input from the antenna signal processing unit 146 and pilot channel signals $PICH_1$ to $PICH_n$ to the data signals input from the basis multiplication unit 156 and outputs the added result to the corresponding antenna 130, 132, . . . , or 134 of the base station antenna array 128. The added result input to the base station antenna array 128 from the addition unit 158 is transmitted to the mobile station 20, 22, . . . , or 24.

As described above, in a mobile communication apparatus using multiple base station and mobile station antennas and a mobile communication method therefor according to the present invention, downlink characteristic information transmitted to a base station from each of the mobile stations is fully reflected for optimal beamforming and data transmission. In addition, the first control signal transmitted from the base station to each of the mobile stations enables the mobile station to receive data in units of a frame on a basis vector basis, so that nominal peak throughput in multi-antenna mobile communications can be efficiently achieved at low costs.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims."

What is claimed is:

1. A mobile communication system including a base station having multiple antennas and at least two mobile stations having multiple antennas, wherein the base station
  restores from feedback signals transmitted from the mobile stations weight information determined in the mobile stations,
  generates from the restored weight information downlink control information ensuring maximum throughput to each of the mobile stations,
  selects from among data of all of the mobile stations data of at least one desired mobile station to be transmitted, based on the downlink control information,
  selects from among the data of all of the mobile stations the data of each of the desired mobile stations based on the mobile station selection information,
  extracts from the selected data an amount of data of each of the desired mobile stations based on a predetermined bit size of each of the desired mobile stations, and
  combines the extracted data into frames with respect to each of the desired mobile stations; and
each of the mobile stations has at least one mobile station antenna, the base station has at least two base station antennas, and the downlink control information includes mobile station selection information, an optimal basis matrix index, and optimal gain indices.

2. The mobile communication system of claim 1, wherein the base station performs a predetermined signal process on the data of the desired mobile station(s), which are selected based on the downlink control information, matrix-multiplies the processed data by a basis matrix selected based on the downlink control information to generate data signals, adds mobile station bit size information and the pilot channel signals to the data signals, and transmits the added results to the desired mobile station(s) on a frame by frame basis.

3. The mobile communication system of claim 2, wherein the predetermined signal process includes modulating and coding the data selected based on the downlink control information, adjusting the gains of the modulated and coded data, and spreading the bandwidths of the gain-adjusted data.

4. The mobile communication system of claim 1, wherein each of the mobile stations measures the channel downlink characteristics of the base station and mobile station antennas based on the pilot channel signals transmitted from the base station, determines the weight information based on the channel downlink characteristics, converts the determined weight information into one of the feedback signals, transmits the converted feedback signal to the base station, and detects a high-speed downlink shared channel signal in units of a frame based on the channel downlink characteristics and based on mobile station bit size information and data signals received from the base station.

5. The mobile communication system of claim 1, wherein the base station comprises:
   a feedback information restoration unit which restores from the feedback signals received from the mobile stations the weight information of each of the mobile stations and outputs the restored weight information;
   a downlink control information generation unit which generates the downlink control information based on the restored weight information received from the feedback information restoration unit and outputs the generated downlink control information.

6. The mobile communication system of claim 5, wherein the base station further comprises:
   a lookup table storing one or more sets of gain values and one or more sets of basis matrices;
   an adaptive modulation and power control unit which selects the bit size of a data frame for each of the mobile stations based on modulation and coding orders, which are obtained based on the optimal gain indices, and outputs the gain values of a set of gain values read from the lookup table, which correspond to the optimal gain indices;
   a mobile station control information generation unit which generates mobile station bit size information including the bit size of a data frame for each of the mobile stations and the mobile station selection information;
   an antenna signal processing unit which converts the mobile station bit size information input from the mobile station control information generation unit into wireless signals and outputs the converted mobile station bit size information as wireless signals;
   an adaptive modulation and coding unit which modulates and codes the data frame input from the mobile station data selection unit in units of a frame based on the modulation and coding orders;
   a first multiplication unit which multiplies the modulated and coded results by the gain values input from the adaptive modulation and power control unit and outputs the products;
   a second multiplication unit which multiplies the products input from the first multiplication unit by spread/scramble signal streams and outputs the products;
   a basis multiplication unit which matrix-multiplies the products input from the second multiplication unit by a basis matrix having the optimal basis matrix index, which is selected from the set of the basis matrices corresponding to the optimal basis matrix index and read from the lookup table, and outputs the products as data signals; and
   an addition unit which adds the mobile station bit size information and pilot channel signals to the data signals, wherein the added results are transmitted on a frame by frame basis to the mobile stations via the base station antennas.

7. The mobile communication system of claim 5, wherein the downlink control information generation unit comprises:
   a weight information extension portion which analyzes the gain indices in the restored weight information to find gain values including a null, generates the indices of null basis matrices based on the found gain values including a null and basis matrix indices in the restored weight information, and generates gain indices in the restored weight information as many as the number of generated null basis matrices;
   a basis matrix-based classification portion which classifies the generated gain indices for each of the indices of the null basis matrices and the classified gain indices, each of which has the number of a mobile station;
   first through Jth maximum value selection portions where J is equal to the number of basis matrices, in which a jth maximum value selection portion, where $1 \leq j \leq J$, selects from among the gain indices output from the basis matrix-based classification portion the index of the largest gain value for each of first through N basis vectors of the corresponding basis matrix, and outputs the index of the largest gain value, the value of j, the value of n indicating the number of the basis vector corresponding to the largest gain value, where $1 \leq n \leq N$, and the number of the mobile station corresponding to the largest gain value; and
   a transmission order determination portion which selects from among the basis matrix indices the optimal basis matrix index using a predetermined determination method, selects from among the indices of the largest gain values input from the first through jth maximum value selection portions the indices of the largest gain values corresponding to the optimal basis matrix indices as the optimal gain indices, and selects and transmits from among the numbers of the base stations corresponding to the indices of the largest gain values the number of the base station corresponding to the optimal basis matrix indices, as the mobile station selection information.

8. The mobile communication system of claim 7, wherein the jth maximum value selection portion comprises j1st through jNth maximum value selectors, in which an jnth main gain selector selects from among the gain indices input from the basis matrix-based classification portion the index of the largest gain value, and outputs the index of the largest gain value, the value of j, and the value of n, and the number of the mobile station corresponding to the index of the largest gain value.

9. The mobile communication system of claim 1, wherein each of the mobile stations further comprises:
   a channel characteristics measurement unit which measures the channel downlink characteristics based on the pilot channel signals received via the at least one mobile station antenna;
   a channel information determination unit which determines the weight information ensuring maximum throughput to each of the mobile stations based on the channel downlink characteristics; and
   an information feedback unit which converts the weight information input from the channel information determination unit into the feedback signal and transmits the feedback signal via the at least one mobile station antennas to the base station.

10. The mobile communication apparatus of claim 9, wherein each of the mobile stations further comprises a data information restoration unit which restores data information received via all of the sub-channels based on the data signals received from the base station and based on the downlink channel characteristics input from the channel characteristics measurement unit.

11. A mobile communication system including a base station having multiple antennas and at least two mobile stations having multiple antennas,
wherein the base station restores from feedback signals transmitted from the mobile stations weight information determined in the mobile stations, generates from the restored weight information downlink control information ensuring maximum throughput to each of the mobile stations, and selects from among data of all of the mobile stations data of at least one desired mobile station to be transmitted, based on the downlink control information, each of the mobile stations has at least one mobile station antenna, the base station has at least two base station antennas, and the downlink control information includes mobile station selection information, an optimal basis matrix index, and optimal gain indices, wherein each of the mobile stations further includes
a data information selection unit which selects from among the data information received via all sub-channels only data information received via a desired sub-channel based on a control information, and outputs the selected data information; and
a data information combination unit which combines the data information input from the data information selection unit over a predetermined period of time and outputs the combined result as a high-speed shared channel signal.

12. The mobile communication system of claim 11, wherein each of the mobile stations further comprises a control information restoration unit which restores the control information by compensating for distortion in the mobile station bit size information received from the base station based on the channel downlink characteristics, in which the control information includes information on whether the data signals received via a desired sub-channel have been included in the mobile station bit size information and information on the bit size of the data signals.

13. A method of mobile communications between a base station having multiple antennas and at least two mobile stations having multiple antennas, the method comprising step (a) of:
the base station
restoring feedback signals transmitted from the mobile stations weight information determined in the mobile stations,
generating from the restored weight information downlink control information ensuring maximum throughput to each of the mobile stations,
selecting from among data of all of the mobile stations data of a desired mobile station to be transmitted, based on the downlink control information, and
(a1) selecting from among the data of all of the mobile stations the data of the desired mobile station based on the mobile station selection information, extracting an amount of data from the selected data based on a predetermined bit size, and combining the extracted data into frames, each of which has the predetermined bit size, for transmission to the desired mobile station,
wherein each of the mobile stations has at least one mobile station antenna, the base station has at least two base station antennas, and the downlink control information includes mobile station selection information, an optimal basis matrix index, and optimal gain indices.

14. The method of claim 13, further comprising step (b) of each of the mobile stations measuring the channel downlink characteristics of the base station and mobile station antennas based on the pilot channel signals transmitted from the base station, determining the weight information based on the channel downlink characteristics, converting the determined weight information into the feedback signals, transmitting the converted feedback signal to the base station, and detecting a high-speed downlink shared channel signal in units of a frame based on the channel downlink characteristics and based on mobile station bit size information and data signals received from the base station.

15. The method of claim 14, wherein step (a) comprises:
(a2) restoring from the feedback signals received from the mobile stations the weight information of each of the mobile stations and outputting the restored weight information; and
(a3) generating the downlink control information based on the restored weight information.

16. The method of claim 13, wherein step (a) comprises:
(a2) restoring from the feedback signals received from the mobile stations the weight information of each of the mobile stations and outputting the restored weight information; and
(a3) generating the downlink control information based on the restored weight information.

17. The method of claim 16, wherein step (a) comprises:
(a4) finding modulation and coding orders based on the optimal gain indices, finding based on the modulation and coding orders the bit size of a data frame for each of the mobile stations, and selecting from among one or more sets of gain values a set of gain values corresponding to the optimal gain indices;
(a5) generating mobile station bit size information including the bit size of a data frame for each of the mobile stations and the mobile station selection information;
(a6) converting the mobile station bit size information into wireless signals and outputting the wireless signals as first control signals; and
(a7) modulating and coding the selected data of the desired mobile station in units of a frame based on the modulation and coding orders;
(a8) multiplying the modulated and coded results by the gain values having the optimal gain indices, which are selected from among one or more set of gain values;
(a9) multiplying the products from step (a8) by spread/ scramble signal streams;
(a10) matrix-multiplying the products from step (a9) by a basis matrix having the optimal basis matrix index, which is selected from the set of the basis matrices corresponding to the optimal basis matrix index and determining the products as the data signals; and
(a11) adding the mobile station bit size information and pilot channel signals to the data signals, wherein the added results are transmitted on a frame by frame basis to the mobile stations via the base station antennas.

18. The method of claim 16, wherein step (a3) comprises:
analyzing the gain indices in the restored weight information to fine null gain values, generating the indices of null basis matrices based on the found null gain values and basis matrix indices in the restored weight information, and multiplying the number of gain indices in the restored weight information by the number of generated null basis matrices;

optionally classifying the multiplied number of gain indices according to the indices of the null basis matrices;

selects from among the optionally classified gain indices the index of the largest gain value for each of first through N basis vectors of each of the J basis matrices corresponding to the mobile stations; and selecting from among the basis matrix indices the optimal basis matrix index using a predetermined determination method, selecting from among the indices of the largest gain values for the J basis matrices the indices of the largest gain values corresponding to the optimal basis matrix indices as the optimal gain indices, selecting from among the numbers of the base stations corresponding to the indices of the largest gain values the number of the base station corresponding to the optimal basis matrix indices, and transmitting the selected number of the base station as the mobile station selection information.

19. A method of mobile communications between a base station having multiple antennas and at least two mobile stations having multiple antennas, the method comprising:

step (a) of the base station restoring feedback signals transmitted from the mobile stations weight information determined in the mobile stations, generating from the restored weight information downlink control information ensuring maximum throughput to each of the mobile stations, and selecting from among data of all of the mobile stations data of a desired mobile station to be transmitted, based on the downlink control information: and step (b) of each of the mobile stations selecting from among the data information received via all sub-channels only data information received via a desired sub-channel based on the first control information, and combining the data information input over a predetermined period of time and outputting the combined result as the high-speed downlink shared channel signal.

20. The method of claim 18, wherein step (b) comprises:

(b1) measuring the channel downlink characteristics based on the pilot channel signals received via the at least one mobile station antenna;

(b2) determining the weight information ensuring maximum throughput to each of the mobile stations based on the channel downlink characteristics; and (b3) converting the determined weight information into the feedback signals and transmitting the feedback signal via the at least one mobile station antennas to the base station.

21. The method of claim 17, wherein step (b) further comprises:

restoring the first control information by compensating for distortion in the bit size of the data received from the base station based on the channel downlink characteristics, in which the first control information includes information on whether the data signals have been received via a desired sub-channel and information on the bit size of the data signals; and restoring data information based on the data signals received via all of the sub-channels from the base station and based on the downlink channel characteristics.

22. A base station having multiple base station antennas, comprising:

a feedback information restoration unit which restores from feedback signals received from at least two mobile stations having multiple mobile station antennas weight information of each of the mobile stations and outputs the restored weight information;

a downlink control information generation unit which generates downlink control information based on the restored weight information received from the feedback information restoration unit and outputs the generated downlink control information, the downlink control information including mobile station selection information, an optimal basis matrix index, and optimal gain indices; and a mobile station data selection unit which selects from among the data of all of the mobile stations the data of each of desired mobile stations based on the mobile station selection information, extracts from the selected data an amount of data of each of the desired mobile stations based on a predetermined bit size of each of the desired mobile stations, and combines the extracted data into frames with respect to each of the desired mobile stations.

23. A mobile station having multiple mobile station antennas, comprising:

a channel characteristics measurement unit which measures channel downlink characteristics based on pilot channel signals received via at least one mobile station antenna;

a channel information determination unit which determines weight information ensuring maximum throughput based on the channel downlink characteristics;

an information feedback unit which converts the weight information input from the channel information determination unit into a feedback signal and transmits the feedback signal via the mobile station antennas to a base station; and a control information restoration unit which restores control information by compensating for distortion in mobile station bit size information received from the base station based on the channel downlink characteristics, in which the control information includes information on whether data signals received via a desired sub-channel have been included in the mobile station bit size information and information on the bit size of the data signals.

24. A mobile communication method at a base station having multiple base station antennas, comprising:

restoring from feedback signals received from at least two mobile stations having multiple mobile station antennas weight information of each of the mobile stations and outputs the restored weight information;

generating downlink control information based on the restored weight information received from the feedback information restoration unit and outputs the generated downlink control information, the downlink control information including mobile station selection information, an optimal basis matrix index, and optimal gain indices;

selecting from among the data of all of the mobile stations the data of each of desired mobile stations based on the mobile station selection information;

extracting from the selected data an amount of data of each of the desired mobile stations based on a predetermined bit size of each of the desired mobile stations; and combining the extracted data into frames with respect to each of the desired mobile stations.

25. A mobile communication method at a mobile station having multiple mobile station antennas, comprising:

measuring channel downlink characteristics based on pilot channel signals received via at least one mobile station antenna;

determining weight information ensuring maximum throughput based on the channel downlink characteristics;

converting the weight information input from the channel information determination unit into a feedback signal and transmits the feedback signal via the mobile station antennas to a base station; and restoring control information by compensating for distortion in mobile station bit size information received from the base station based on the channel downlink characteristics, in which the control information includes information on whether data signals received via a desired sub-channel have been included in the mobile station bit size information and information on the bit size of the data signals.

\* \* \* \* \*